(12) United States Patent
Lee et al.

(10) Patent No.: US 8,593,583 B2
(45) Date of Patent: Nov. 26, 2013

(54) LIQUID CRYSTAL DISPLAY AND DRIVING METHOD THEREOF

(75) Inventors: Seung-Hoon Lee, Yongin-si (KR);
Joo-Seok Yeom, Gwacheon-si (KR);
Hee-Seop Kim, Hwaseong-si (KR);
Sung-Woon Kim, Suwon-si (KR);
Jiangang Lu, Suwon-si (KR)

(73) Assignee: Samsung Display Co., Ltd. (KR)

( * ) Notice: Subject to any disclaimer, the term of this patent is extended or adjusted under 35 U.S.C. 154(b) by 954 days.

(21) Appl. No.: 12/409,962

(22) Filed: Mar. 24, 2009

(65) Prior Publication Data

US 2009/0322974 A1    Dec. 31, 2009

(30) Foreign Application Priority Data

Jun. 25, 2008    (KR) .................. 10-2008-0060272

(51) Int. Cl.
*G02F 1/136*    (2006.01)
*G02F 1/141*    (2006.01)
*G02F 1/1337*    (2006.01)

(52) U.S. Cl.
USPC .............................. 349/48; 349/136; 349/191

(58) Field of Classification Search
None
See application file for complete search history.

(56) References Cited

U.S. PATENT DOCUMENTS

| | | | |
|---|---|---|---|
| 2002/0140649 A1* | 10/2002 | Aoyama et al. | 345/87 |
| 2005/0024548 A1 | 2/2005 | Choi et al. | |
| 2005/0041186 A1 | 2/2005 | Shimoshikiryo | |
| 2007/0108408 A1* | 5/2007 | Kumar | 252/299.61 |
| 2009/0040410 A1* | 2/2009 | Woo et al. | 349/43 |

FOREIGN PATENT DOCUMENTS

| | | |
|---|---|---|
| JP | 2000356786 | 12/2000 |
| JP | 2002182228 | 6/2002 |
| JP | 2007045806 | 2/2007 |
| JP | 2007334177 | 12/2007 |
| KR | 1020020002590 | 1/2002 |
| KR | 1020020076401 | 10/2002 |
| KR | 1020020091694 | 12/2002 |
| KR | 1020050079133 | 8/2005 |
| KR | 1020070070015 | 7/2007 |

* cited by examiner

*Primary Examiner* — Sarah Hahm
(74) *Attorney, Agent, or Firm* — Cantor Colburn LLP

(57) ABSTRACT

The present invention relates to a liquid crystal display including: a first substrate, a gate line formed disposed on the first substrate, a first data line and a second data lines formed both of which are disposed on the first substrate, and insulated from and intersection disposed substantially perpendicular to the gate line, a first thin film transistor connected to the gate line and the first data line, a second thin film transistor connected to the gate line and the second data line, a first pixel electrode connected to the first thin film transistor, a second pixel electrode connected to the second thin film transistor, a second substrate facing disposed substantially opposite to the first substrate, a common electrode formed disposed on the second substrate, and a liquid crystal layer disposed between the first substrate and the second substrate, and including biaxial liquid crystal.

11 Claims, 15 Drawing Sheets

FIG.5

| Surface alignment (n-axis) | Vertical alignment |
|---|---|
| m-axis | Perpendicular to rubbing direction |
| Vertical field | unstable (degeneracy) stable, if fringe field |

| Initial alignment | Polarizer |
|---|---|
| Under the application of the voltage | Polarizer |

LIQUID CRYSTAL DISPLAY AND DRIVING METHOD THEREOF

This application claims priority to Korean Patent Application No. 10-2008-0060272, filed on Jun. 25, 2008, and all the benefits accruing therefrom under 35 U.S.C. §119, the contents of which in its entirety are herein incorporated by reference.

BACKGROUND OF THE INVENTION (a) Field of the Invention

The present invention relates to a liquid crystal display using a biaxial liquid crystal and a driving method thereof.

(b) Description of the Related Art

Liquid crystal displays ("LCDs") are one of the most widely used flat panel displays, and an LCD includes a pair of panels provided with field-generating electrodes, such as pixel electrodes and a common electrode, and a liquid crystal ("LC") layer interposed between the two panels. The LCD displays images by applying voltages to the field-generating electrodes to generate an electric field in the LC layer that determines the orientations of LC molecules therein to adjust polarization of incident light.

In general, the LCD is manufactured using uniaxial liquid crystal. The uniaxial liquid crystal has a characteristic that the refractive index values of two axes directions among three axes directions are the same, but the refractive index value of the remaining axis direction (this is referred to as an optical axis in the uniaxial liquid crystal) is different from the refractive index value of the other two axes.

Retardation of light passing through the liquid crystal is different according to axis directions due to the differences of the refractive indexes, and as a result the components of the polarization of the light are changed. On the other hand, the arrangement of the liquid crystal is changed according to the electric field such that the electric field is controlled to control the components of the polarization of passed light.

When using the uniaxial liquid crystal, two values of the refractive index are considered such that it is easy to control the components of the polarization of the light by controlling the electric field.

However, when using the uniaxial liquid crystal, because the liquid crystal material used in the liquid crystal display is limited, it is also difficult to manufacture various types of LCDs.

BRIEF SUMMARY OF THE INVENTION

The present invention provides exemplary embodiments of a liquid crystal display ("LCD") and a driving method thereof using a biaxial liquid crystal.

In exemplary embodiments of the present invention, a biaxial liquid crystal is used, and one pixel area includes two pixel electrodes and one common electrode in the LCD and a driving method thereof.

An exemplary embodiment of an LCD according to an exemplary embodiment of the present invention includes; a first substrate, a gate line disposed on the first substrate, first and second data lines disposed on the first substrate and insulated from and disposed substantially perpendicular to the gate line, a first thin film transistor ("TFT") connected to the gate line and the first data line, a second TFT connected to the gate line and the second data line, a first pixel electrode connected to the first TFT, a second pixel electrode connected to the second TFT, a second substrate disposed substantially opposite to the first substrate, a common electrode disposed on the second substrate, and a liquid crystal layer disposed between the first substrate and the second substrate, and including biaxial liquid crystal.

In one exemplary embodiment, the first and second pixel electrodes may respectively include first and second stems, and a plurality of first and second branches respectively connected to the first and second stems.

In one exemplary embodiment, the first branches and the second branches may be alternately disposed with respect to each other.

In one exemplary embodiment, the first and second stems may be disposed substantially parallel to the gate line, or the first and second data lines, and the first and second branches may be disposed substantially perpendicular to the first and second stems.

In one exemplary embodiment, the first and second pixel electrodes may respectively further include first and second connections for connection with first and second TFTs.

In one exemplary embodiment, the branches may be curved with a predetermined angle.

In one exemplary embodiment, the first pixel electrode and the second pixel electrode are configured to include a period in which substantially the same voltage is applied thereto and a period in which a different voltage is applied thereto during one frame.

In one exemplary embodiment, the biaxial liquid crystal may have different refractive indexes and different dielectric ratios in x-, y-, and z-axis directions, and an axis direction having a maximum refractive index and an axis direction having a maximum dielectric ratio may be different from each other.

In one exemplary embodiment, the biaxial liquid crystal may have different refractive indexes and different dielectric ratios in x-, y-, and z-axis directions, and an axis direction having a maximum refractive index and an axial direction having a maximum dielectric ratio may be substantially the same.

In on exemplary embodiment, a rubbing direction for the biaxial liquid crystal may be oblique to the gate line and the first and second data lines.

In one exemplary embodiment, polarizers attached on the outside surface of the first substrate and the second substrate may be further included, and transmittance directions of the polarizers may be oblique to the gate line and the first and second data lines.

An exemplary embodiment of a driving method of an exemplary embodiment of an LCD including first and second TFTs connected to one gate line, first and second data lines, first and second pixel electrodes respectively connected to the first and second TFTs, a common electrode facing the first and second pixel electrodes, and a biaxial liquid crystal according to the present invention includes; applying a gate-on voltage to the gate line, applying a first data voltage to the first data line, and applying a second data voltage to the second data line, wherein the applying of the second data voltage divides one frame into at least two periods including a first period wherein a voltage with substantially the same polarity and magnitude as the first data voltage is applied to the second data line as the second data voltage, and a second period wherein a voltage with a different polarity and magnitude from the first data voltage is applied to the second data line as the second data voltage.

In one exemplary embodiment, the first period begins again after the second period has passed at the end of one frame, and the first period and the second period are alternately applied.

In one exemplary embodiment, the second data voltage applied during the second period may be substantially the same voltage as that applied to the common electrode.

In one exemplary embodiment, the second data voltage applied in the second period may have substantially the same magnitude as the first data voltage and the opposite polarity to that of the first data voltage.

In one exemplary embodiment, the length of the first period may be greater than the length of the second period for one frame.

In one exemplary embodiment, the driving method of the LCD may further include applying a voltage to the common electrode, wherein the common electrode is applied with the common voltage during the first period, and the common electrode is electrically connected to a floating ground potential in the second period.

An exemplary embodiment of a driving method of an exemplary embodiment of an LCD according to the present invention includes applying a horizontal electric field to the biaxial liquid crystal, pre-tilting the biaxial liquid crystal using the horizontal electric field, and applying a vertical electric field to the biaxial liquid crystal after pre-tilting the biaxial liquid crystal.

In one exemplary embodiment, the horizontal electric field and the vertical electric field may be alternately applied in one frame.

In one exemplary embodiment, a black gray level may be displayed before applying the horizontal electric field.

In one exemplary embodiment, a gray level may be displayed by controlling the vertical electric field in the applying of the vertical electric field.

In one exemplary embodiment, the applying of the horizontal electric field and the applying of the vertical electric field may be alternately executed.

Considering the characteristics of the biaxial liquid crystal molecules, exemplary embodiments of the present invention may include two pixel electrodes and one common electrode formed in one pixel, and the biaxial liquid crystal molecules may be pre-tilted by the horizontal electric field and controlled by the vertical electric field to provide the LCD displaying the images in the LCD using the biaxial liquid crystal molecules. Accordingly, when displaying the black gray level, light leakage is not generated such that the contrast ratio for a white gray level may be improved and the color impression may be improved.

BRIEF DESCRIPTION OF THE DRAWINGS

FIG. 5 is a diagram illustrating an exemplary embodiment of an arrangement of liquid crystal molecules when applying a vertical electric field in an LCD according to the present invention.

DETAILED DESCRIPTION OF THE INVENTION

Figure 1:
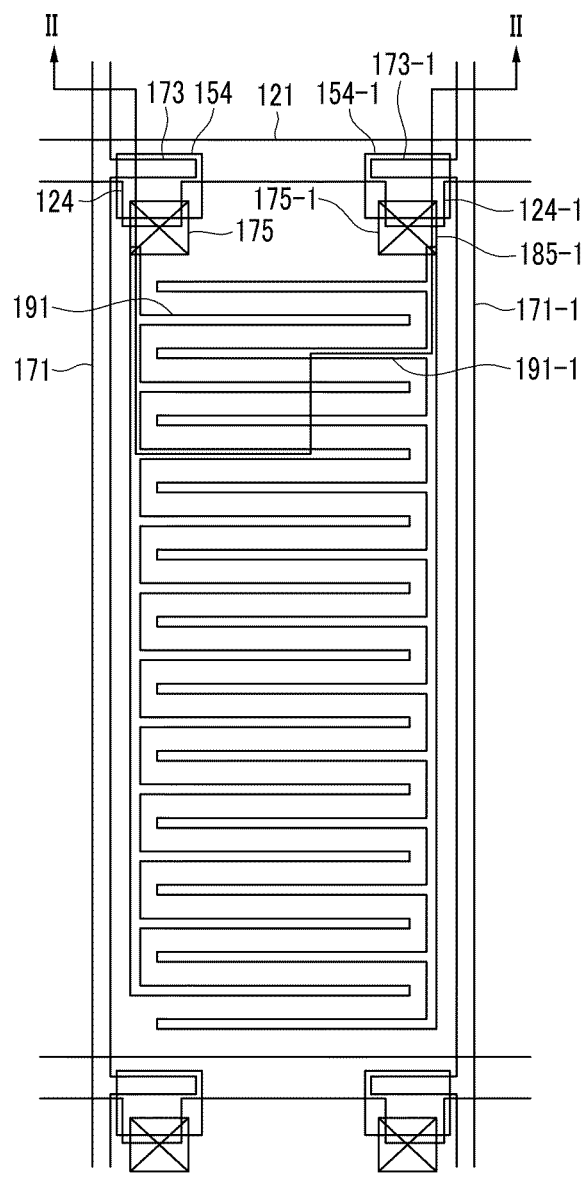
FIG. 1 is a top plan layout view of one pixel in an exemplary embodiment of a liquid crystal display ("LCD") according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings. Firstly, a liquid crystal display according to an exemplary embodiment of the present invention will be described with reference to FIG. 1 and FIG. 2.

Figure 2:
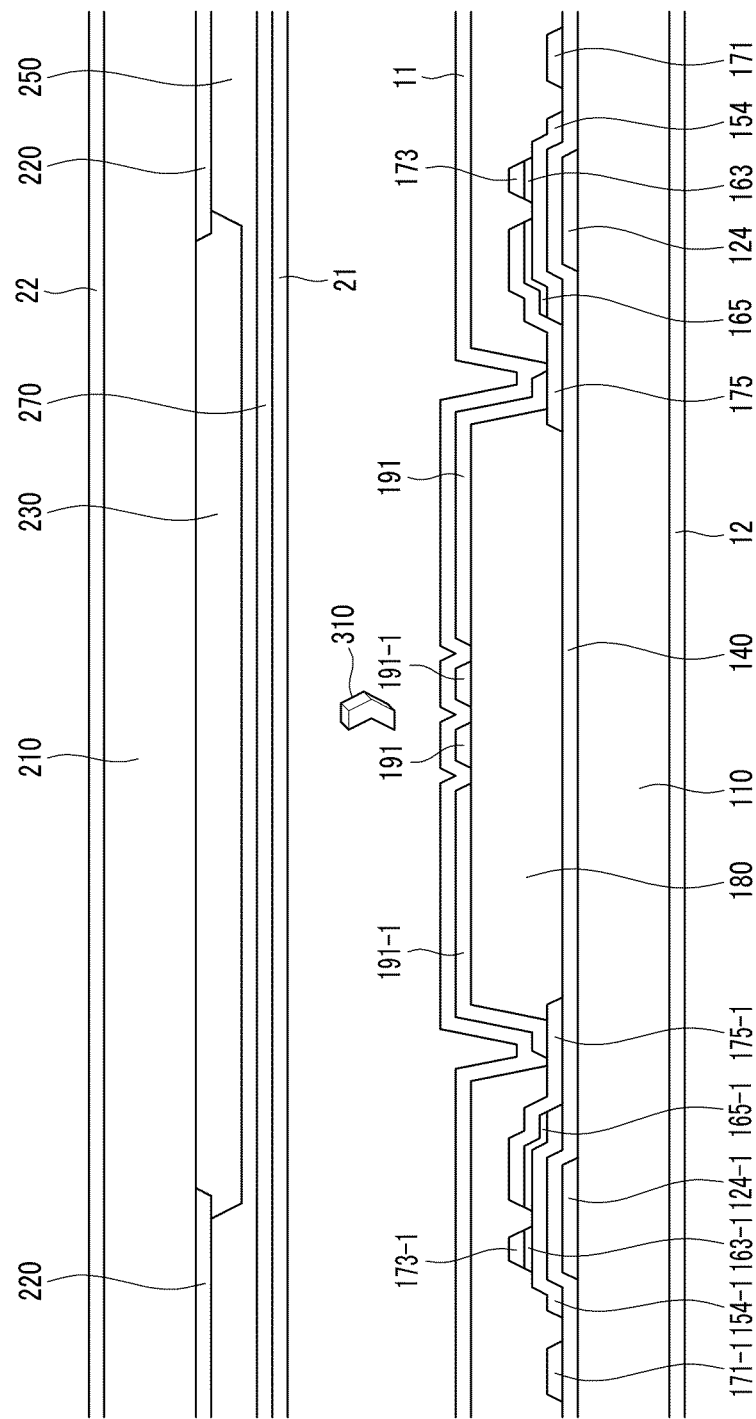
FIG. 2 is a cross-sectional view of the exemplary embodiment of an LCD shown in FIG. 1 taken along line II-II.

FIG. 1 is a top plan layout view of one pixel in an exemplary embodiment of a liquid crystal display ("LCD") according to the present invention, and FIG. 2 is a cross-sectional view of the exemplary embodiment of an LCD shown in FIG. 1 taken along line II-II.

Referring to FIG. 1 and FIG. 2, in an LCD according to an exemplary embodiment of the present invention, one pixel includes two data lines 171 and 171-1, two TFTs, and two pixel electrodes 191 and 191-1, and an upper substrate 210 is provided with a common electrode 270.

Now, a detailed structure of an exemplary embodiment of an LCD according to the present invention will be described with reference to FIG. 1 and FIG. 2.

A plurality of gate lines 121 are formed on an insulating substrate 110, exemplary embodiments of which may be made of a material such as transparent glass or plastic.

The gate lines 121 transmit gate signals and extend in a substantially transverse direction. Each gate line 121 includes a plurality of gate electrodes 124 and 124-1 protruding downward. Two gate electrodes 124 and 124-1 are disposed within one pixel, and hereafter, a gate electrode of the left side is referred to as a first gate electrode 124 and a gate electrode of the right side is referred to as a second gate electrode 124-1, with reference to FIG. 1.

A gate insulating layer 140, exemplary embodiments of which may be made of a silicon nitride ("SiNx") or silicon dioxide ("SiOx"), is formed on the gate lines 121.

A plurality of semiconductor islands 154 and 154-1, exemplary embodiments of which may be made of hydrogenated amorphous silicon (simply referred to as a-Si) or crystallized silicon, are formed on the gate insulating layer 140. Two semiconductor islands are disposed within each pixel, and hereafter, a semiconductor island of the left side is referred to as a first semiconductor 154, and a semiconductor island of the right side is referred to as a second semiconductor 154-1, with reference to FIG. 1. The first semiconductor 154 is disposed on the first gate electrode 124, and the second semiconductor 154-1 is disposed on the second gate electrode 124-1.

A plurality of ohmic contact islands 163 and 165, and 163-1 and 165-1, are respectively formed on the semiconductors 154 and 154-1. Exemplary embodiments of the ohmic contacts may be made of n+ hydrogenated a-Si heavily doped with an N-type impurity such as phosphorous, or they may be made of a silicide. The ohmic contacts are formed in pairs and are respectively disposed on the semiconductors 154 and 154-1.

A plurality of data lines 171 and 171-1 and a plurality of drain electrodes 175 and 175-1 are respectively formed on the ohmic contacts 163 and 165, and 163-1 and 165-1, and on the gate insulating layer 140. Two data lines 171 and 171-1 and two drain electrodes 175 and 175-1 are also disposed per pixel, and hereafter, a data line and a drain electrode of the left side are referred to as a first data line 171 and a first drain electrode 175, and a data line and a drain electrode of the right side are referred to as a second data line 171-1 and a second drain electrode 175-1, with reference to FIG. 1.

The data lines 171 and 171-1 transmit data signals and extend in a substantially longitudinal direction, thereby being disposed substantially perpendicular to the gate lines 121. The data lines 171 and 171-1 include a plurality of source electrodes 173 and 173-1 respectively extending toward the gate electrodes 124 and 124-1. Two source electrodes 173 and 173-1 are disposed per pixel, and hereafter, a source electrode of the left side is referred to as a first source electrode 173, and a source electrode of the right side is referred to as a second source electrode 173-1, with reference to FIG. 1.

The drain electrodes 175 and 175-1 are separated from the data lines 171 and 171-1 and are disposed substantially opposite to the source electrodes 173 and 173-1 with respect to the gate electrodes 124 and 124-1.

The gate electrodes 124 and 124-1, the source electrodes 173 and 173-1, and the drain electrodes 175 and 175-1 respectively form thin film transistors ("TFTs") along with semiconductor islands 154 and 154-1, and the channels of the TFTs are formed in the semiconductor islands 154 and 154-1 between the source electrodes 173 and 173-1 and the drain electrodes 175 and 175-1. As above-described, two TFTs are disposed in one pixel, the TFT of the left side is referred to as the first TFT, and the TFT of the right side is referred to as the second TFT, with reference to FIG. 1.

A passivation layer 180 is formed on the data lines 171 and 171-1, the drain electrodes 175 and 175-1, and the exposed semiconductors 154 and 154-1. Exemplary embodiments of the passivation layer 180 may be made of an inorganic insulator or an organic insulator, and may have a flat surface. Exemplary embodiments of the inorganic insulator may be made of silicon nitride and/or silicon oxide. The organic insulator may have photosensitivity, and in one exemplary embodiment the dielectric constant thereof is less than about 4.0. Also, in one exemplary embodiment the passivation layer 180 may have a dual-layered structure including a lower inorganic layer and an upper organic layer so as to not cause damage to the exposed portions of the semiconductors 154 and 154-1 while maintaining the excellent insulating characteristics of the organic layer.

The passivation layer 180 has a plurality of contact holes (not shown) respectively exposing the drain electrodes 175 and 175-1. The contact hole which exposes the first drain electrode 175 therethrough is referred to as a first contact hole, and the contact hole which exposes the second drain electrode 175-1 therethrough is referred to as a second contact hole.

A plurality of pixel electrodes 191 and 191-1 are formed on the passivation layer 180. In one exemplary embodiment, they may be made of a transparent conductive material such as indium tin oxide ("ITO") or indium zinc oxide ("IZO"), and two pixel electrodes 191 and 191-1 are also disposed within each pixel.

The first pixel electrode 191 is physically and electrically connected to the first drain electrode 175 through the first contact hole and is applied with the first data voltage from the first drain electrode 175. On the other hand, the second pixel electrode 191-1 is physically and electrically connected to the second drain electrode 175-1 through the second contact hole and is applied with the second data voltage from the second drain electrode 175-1. The relationship between the first data voltage and the second data voltage will be described later.

The first pixel electrode 191 includes a first stem disposed substantially parallel to the data lines 171 and 171-1, and a plurality of first branches disposed substantially perpendicular thereto. On the other hand, the second pixel electrode 191-1 includes a second stem disposed substantially parallel to the data lines 171 and 171-1, and a plurality of second branches disposed substantially perpendicular thereto. The first stem and the second stem are disposed opposite to each other with a predetermined interval therebetween, and the first branches and the second branches are alternately disposed with a predetermined interval therebetween and are substantially parallel to each other.

Now, an upper panel facing the lower panel will be described in more detail. A black matrix 220 having openings therein is formed under the upper insulating substrate 210, and a color filter 230 is formed in the opening. An overcoat 250 is formed on the black matrix 220 and the color filter 230, and a common electrode 270 is formed on the overcoat 250. In one exemplary embodiment, one common electrode 270 is formed for all pixels such that the same common voltage is applied to all pixels.

The first and second pixel electrodes 191 and 191-1, to which the first and second data voltages are applied, generate an electric field together with the common electrode 270 to thereby determine a direction of liquid crystal molecules 310 of the liquid crystal layer 3 between the electrodes 191 and 191-1, and 270. Here, a horizontal electric field is formed between the first pixel electrode 191 and the second pixel electrode 191-1, and a vertical electric field is formed between the first pixel electrode 191 or the second pixel electrode 191-1, and the common electrode 270.

Figure 3:
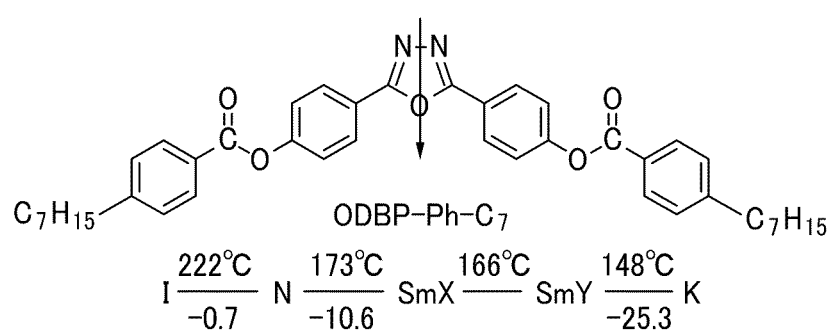
FIG. 3 shows a structural formula of an exemplary embodiment of a biaxial liquid crystal molecule used in an exemplary embodiment of the present invention.

In the present exemplary embodiment, the liquid crystal molecules 310 forming a liquid crystal layer are biaxial liquid crystal molecules such that values of refractive indexes of an l-axis, an m-axis, and an n-axis thereof, wherein the l-axis, m-axis and n-axis are substantially perpendicular to one another, have different characteristics, and a chemical structural formula of the liquid crystal molecules used in an exemplary embodiment of the present invention is shown in FIG. 3. The liquid crystal molecules shown in FIG. 3 are ODBP-Ph-$C_7$, and phase changes according to temperature are shown. Also, the liquid crystal molecules 310 used in an exemplary embodiment of the present invention have different dielectric constants of the l-axis, the m-axis, and the n-axis.

The exemplary embodiments of liquid crystal molecules 310 according to the present invention have a molecule structure in the m-axis direction with reference to a curved central portion thereof, and the m-axis direction is shown by the arrow pointing in the lower direction in FIG. 3. The l-axis and the n-axis that are respectively perpendicular to the m axis are not shown, however the exemplary embodiment of liquid crystal molecules 310 according to the present invention have the following characteristics for the m-axis, the l-axis, and the n-axis.

With reference to the refractive index, they have the characteristics that the refractive index along the l-axis direction is largest, the refractive index along the n-axis direction is smallest, and the refractive index of the m-axis direction is a value between the refractive index along the l-axis direction and the n-axis direction.

On the other hand, with reference to the dielectric ratio, the exemplary embodiment of liquid crystal molecules 310 according to the present invention have the characteristics that the dielectric ratio of the m-axis direction is largest, the refractive index of the n-axis direction is smallest, and the dielectric ratio of the l-axis direction is a value between the dielectric ratio along the m-axis direction and the n-axis direction.

Also, the exemplary embodiments of liquid crystal molecules 310 according to the present invention are arranged substantially perpendicular to the m-axis with reference to a rubbing direction.

The polarization of light passing through the liquid crystal layer 3 is changed according to the direction of the liquid crystal molecules determined as above-described. The pixel electrodes 191 and 191-1, and the common electrode 270, form capacitors (hereafter referred to as "liquid crystal capacitors"), and they maintain the applied voltage after the TFTs are turned off.

Alignment layers (not shown) are coated on the inner surfaces of the display panels, and the liquid crystal is aligned in a predetermined direction through the rubbing. Polarizers are provided at the outer surfaces of the display panels, and the polarization axes of the two polarizers cross each other. In one exemplary embodiment, one of the polarization axes is inclined about 45 degrees with respect to the gate lines 121.

For the LCD according to an exemplary embodiment of the present invention, the liquid crystal arrangement according to the liquid crystal molecules 310, the rubbing direction, and the vertical electric field will be described with reference to FIG. 5.

Figure 4:
FIG. 4 shows plane views of three exemplary embodiments of biaxial liquid crystal molecules according to the present invention.

FIG. 4 shows plane views of three exemplary embodiments of biaxial liquid crystal molecules according to the present invention, and FIG. 5 is a diagram illustrating an exemplary embodiment of an arrangement of liquid crystal molecules when applying a vertical electric field in an exemplary embodiment of an LCD according to the present invention.

Before the explanation of FIG. 5, FIG. 4 will be described. In FIG. 4, the exemplary embodiments of biaxial liquid crystal molecules according to the present invention are shown in a variety of different planes. The reference characters in the plane view represent respective corresponding directions, and FIG. 4 is illustrated based on the refractive index. In FIG. 4, the magnitude of the refractive index is indicated by the length of the illustrated biaxial liquid crystal molecule of the corresponding direction. For example, the leftmost illustration indicates that the refractive index of m direction is smaller than that of n direction.

FIG. 5 shows the exemplary embodiment in which the vertical electric field is applied, "S" is an equal dielectric ratio view according to an exemplary embodiment of the present invention, and "R" indicates a rubbing direction. The bar on the left hand side of the box indicating the rubbing direction R indicates an initial alignment state of the liquid crystal molecule and the bar on the right hand side of the box indicates a changed alignment state of the liquid crystal molecule when a electric field is applied. The transmissive axes of the upper and lower polarizers form an angle of substantially 45 degrees with the rubbing direction in this exemplary embodiment.

Firstly, referring to the equal dielectric ratio view S, the state of the liquid crystal molecules 310 moves in the arrow direction when applying the vertical electric field. Likewise, the state of the liquid crystal molecules 310 having moved is the same as the shape of the liquid crystal molecules under the initial alignment.

In the initial alignment, the m-axis is substantially perpendicular to the rubbing direction such that the liquid crystal molecules 310 are arranged in the initial alignment. If the vertical electric field is applied, the m-axis having the largest dielectric ratio is rotated by the influence of the vertical electric field such that the m-axis is directed to the vertical direction and the liquid crystal molecules 310 are arranged in the direction of the electric field.

Likewise, when the liquid crystal molecules 310 are rotated, it is difficult to confirm whether the m-axis of the liquid crystal molecules 310 is rotated in only one direction and arranged in the vertical direction. Therefore, a pre-tilt is typically provided to control the liquid crystal molecules to rotate in the predetermined direction.

Also, the liquid crystal molecules form substantially the same angle with the transmissive axis of the polarizer under the initial alignment and the alignment during the application of the electric field such that the light leakage may be generated when displaying a black gray level, and accordingly it is desirable for the light leakage to be eliminated.

Figure 6:
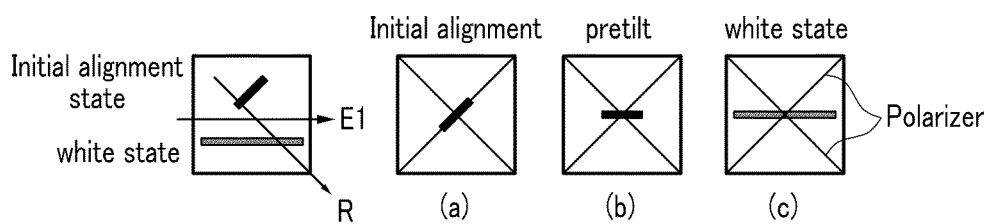
FIG. 6 and FIG. 7 are views illustrating an operation of exemplary embodiments of liquid crystal molecules in an exemplary embodiment of an LCD according to the present invention.

In an exemplary embodiment of the present invention, the exemplary embodiment of an LCD including the biaxial liquid crystal molecules operated as in FIG. 6 is provided, and the structure of the exemplary embodiment of an LCD has been previously explained with reference to FIG. 1 and FIG. 2.

Figure 7:
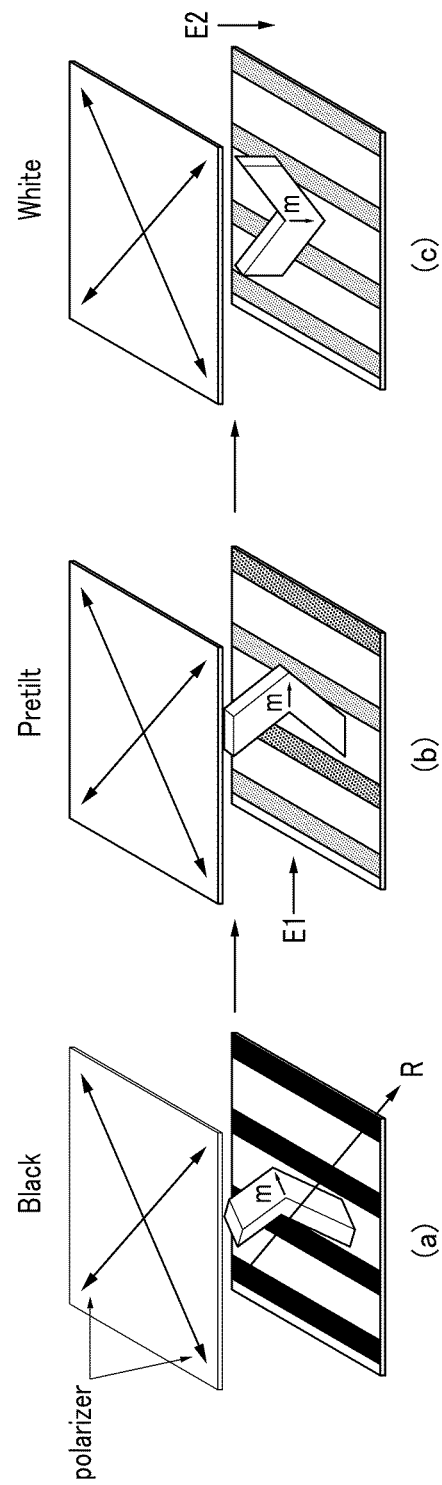

FIG. 6 and FIG. 7 are views showing an exemplary embodiment of operation of liquid crystal molecules according to an exemplary embodiment of an LCD according to the present invention.

In FIG. 6 and FIG. 7, the initial alignment, the pre-tilt, and the alignment stage under the application of the electric field of the liquid crystal molecules are shown in the exemplary embodiment of an LCD according to the present invention, and they are shown in a planar fashion in FIG. 6 and are represented three-dimensionally in FIG. 7 for the easy description thereof.

Firstly, the rubbing direction R is shown by the direction of the arrow "R" and the transmissive axis direction of the polarizers are shown by the diagonal lines. The transmissive axis direction of one of the polarizers is substantially parallel to the rubbing direction R and the transmissive axis direction of the other of the polarizers is substantially perpendicular to the rubbing direction R. The views in FIG. 7 include a representation of the first and second pixel electrodes 191 and 191-1 as bars underneath the liquid crystal molecule. The pixel electrodes 191 and 191-1 are shown in an off-state, in a state where a first electric field E1 is applied, and a state where a second electric field E2 is applied.

Firstly, the m-axis of the initial alignment is substantially perpendicular to the rubbing direction such that the liquid crystal molecules 310 are arranged as in FIG. 6(a) and FIG. 7(a).

Next, the horizontal electric field E1 is applied to provide the pre-tilt as in FIG. 6(b) and FIG. 7(b).

Next, the vertical electric field E2 is applied such that the liquid crystal molecules 310 are arranged as in FIG. 6(c) and FIG. 7(c) to display the white gray level. Alternative exemplary embodiments include configurations wherein the black gray level may be displayed in the initial alignment that the liquid crystal molecules 310 are arranged in the same direction as one of the transmissive axes of the polarizers as in FIG. 6(a) and FIG. 7(a).

Figure 8:
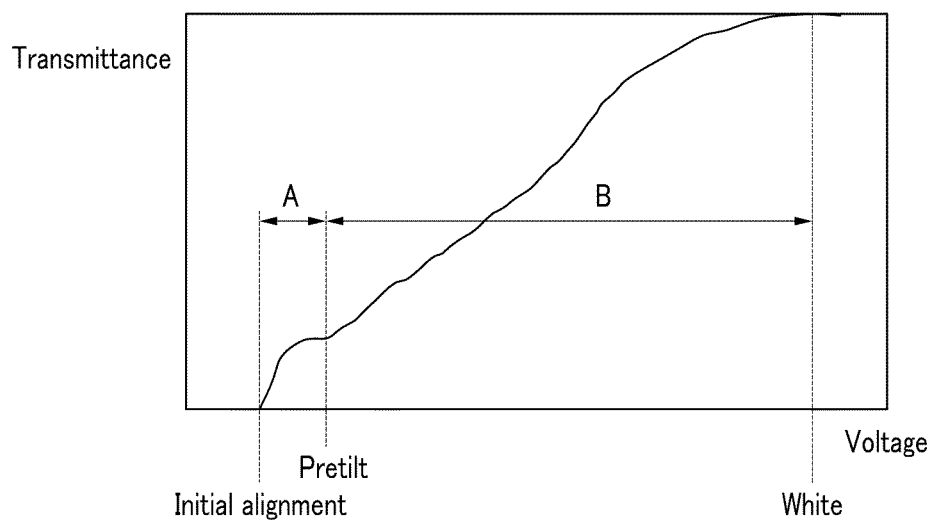
FIG. 8 is a graph illustrating transmittance of a voltage of the liquid crystal molecules according to the exemplary embodiment of FIG. 6.

FIG. 8 is a graph showing transmittance for a voltage of the liquid crystal molecules according to the exemplary embodiment of FIG. 6.

In the initial alignment state, the transmittance is smallest, and the liquid crystal molecules are pre-tilted according to the horizontal electric field. During the time A in which the liquid crystal molecules are pre-tilted, the transmittance is not uniformly increased, and it may be difficult to use for displaying a uniform grayscale to generate images.

On the other hand, if the vertical electric field is applied after the finish of the pre-tilt, the m-axis of the liquid crystal molecules are arranged in the vertical direction such that the transmittance is gradually increased, and the transmittance of the highest voltage corresponds to a maximum light transmittance. In the present exemplary embodiment, the white gray level is displayed in the maximum transmittance, and the transmittance is gradually increased according to the voltage during the time B in which the liquid crystal molecules are vertically arranged such that the appropriate gray level may be displayed by controlling the voltages applied thereto. However, the transmittance may be reduced in the initial alignment state such that the initial alignment state may be displayed as the black gray level, but the present invention is not limited thereto.

Various methods of driving of the exemplary embodiment of an LCD according to the present invention will be described with reference to FIG. 9 to FIG. 13.

Figure 9A:
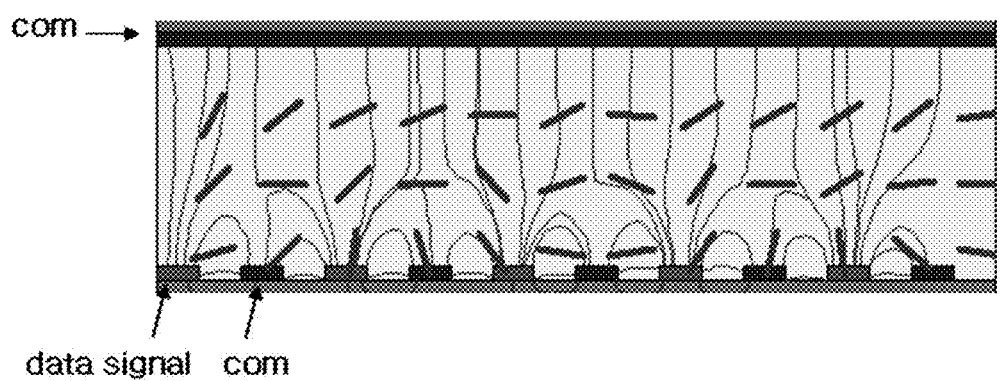
FIGS. 9A and 9B are schematic cross-sectional views illustrating an exemplary embodiment of a method of driving an exemplary embodiment of an LCD according to the present invention.
Figure 9B:
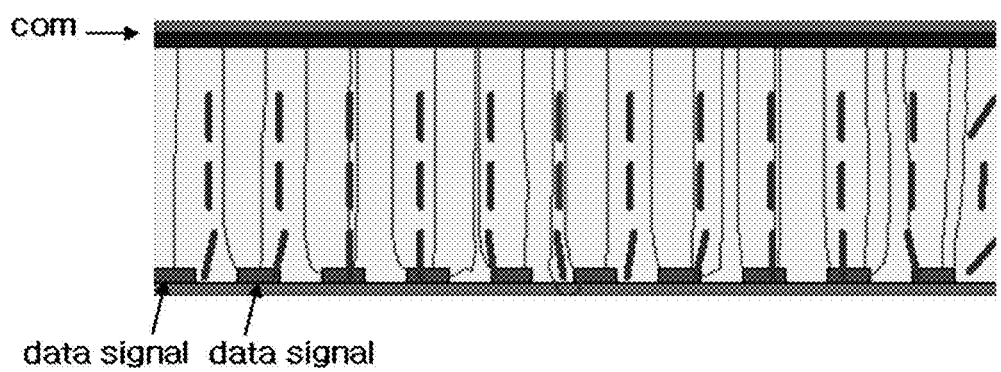
Figure 10:
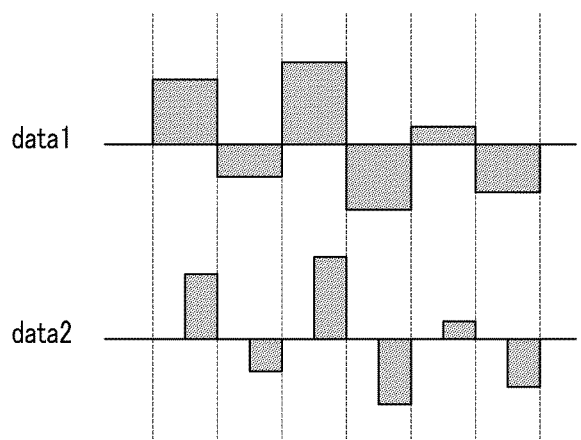
FIG. 10 is a waveform diagram showing an exemplary embodiment of a method of driving an exemplary embodiment of an LCD according to the present invention.

FIGS. 9A, 9B and FIG. 10 are views showing a driving type of a LCD according to an exemplary embodiment of the present invention.

FIGS. 9A and 9B are a cross-sectional view of an exemplary embodiment of an LCD and schematically represents a common electrode of an upper panel and the first and second pixel electrodes of a lower panel, and represents an arrangement of liquid crystal molecules according to an electric field. In FIG. 9, a solid line indicates the electric field, and a dotted line indicates the orientation of liquid crystal molecules. The first and second pixel electrodes are alternately arranged along the bottom of the cross-sectional view, the leftmost pixel electrode is the first pixel electrode, and the second pixel electrode and the first pixel electrode are alternately disposed toward the right side therefrom.

FIGS. 9A and 9B include cross-sectional views, and the common electrode is applied with a common voltage and the first pixel electrodes are applied with the first data signal in the cross-sectional view of FIG. 9A and the lower cross-sectional view of FIG. 9B. However, the second pixel electrodes are applied with the common voltage in the cross-sectional view of FIG. 9A, and are applied with the first data signal in the cross-sectional view of FIG. 9B.

That is, during the time a gate-on signal is applied through one gate line, the first pixel electrode is applied with the first data signal, however the second pixel electrode is dividedly applied with the first data signal and the common voltage.

FIG. 10 shows an exemplary embodiment of a waveform diagram of the above-described driving types with reference to each data line.

In FIG. 10, data1 indicates the first data voltage according to the first data signal applied to the first pixel electrode, and data2 is a signal that is divided into the first data signal and the common voltage and applied to the second pixel electrode. On the other hand, the dotted line formed in a vertical direction represents the time that the gate-on voltage is applied to one gate line, and the horizontal line represents the common voltage, in FIG. 10.

The first pixel electrode is applied with the first data voltage according to the first data signal during the application of the gate-on voltage. In contrast, if the gate-on voltage is applied, the second pixel electrode is firstly applied with the common voltage during a predetermined interval, and is secondly applied with the first data voltage after the predetermined interval. As shown in FIG. 10, in the present exemplary embodiment the predetermined interval is approximately half of the period of application of the first data signal data1. However, alternative exemplary embodiments include configurations wherein the length of the period of application of the first data signal to the second data line is greater than the period of application of the second data signal to the second data line.

If the LCD is driven as described above, the horizontal electric field is formed between the first pixel electrode and the second pixel electrode during the time in which the second pixel electrode is applied with the common voltage such that the liquid crystal molecules are pre-tilted, and then if the first data voltage is applied to the second pixel electrode, the horizontal electric field disappears and the vertical electric field is applied such that the liquid crystal molecules are rotated, thereby displaying the desired transmittance.

When the second pixel electrode is applied with the common voltage, because the common electrode is applied with the common voltage, the vertical electric field also exists between the first pixel electrode and the common electrode. However, the distance between the first pixel electrode and the common electrode is larger than the distance between the first pixel electrode and the second pixel electrode such that the horizontal electric field is more strongly applied, thereby forming the pre-tilt without difficulty.

Figure 11A:
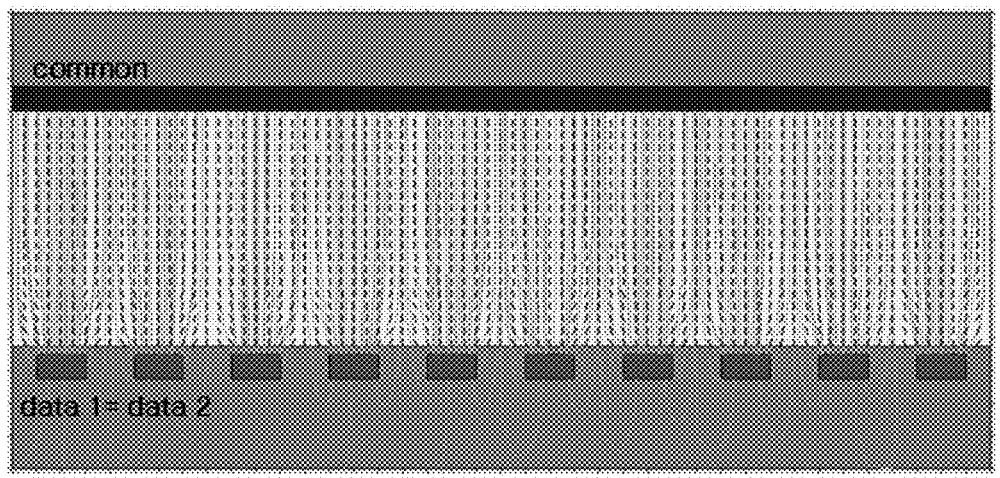
FIGS. 11A and 11b are schematic cross-sectional views illustrating another exemplary embodiment of a method of driving an exemplary embodiment of an LCD according to the present invention.
Figure 11B:
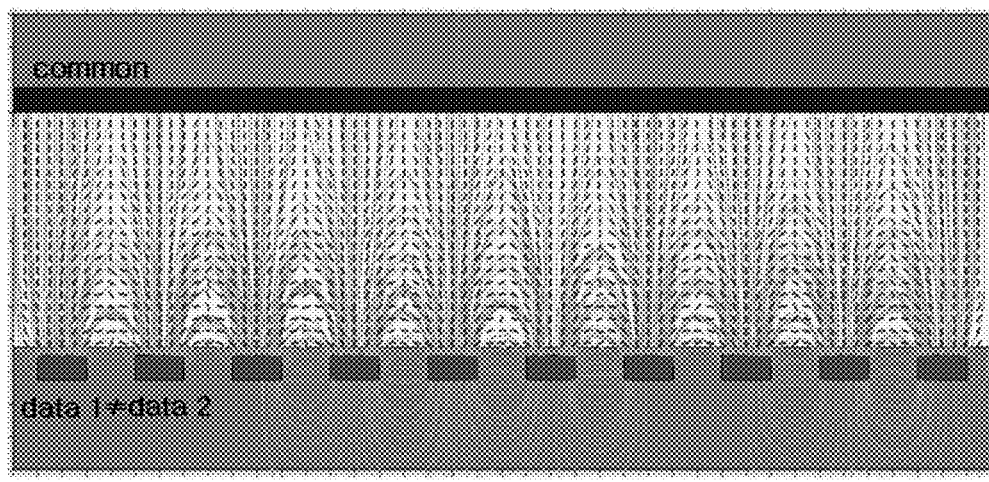
Figure 12:
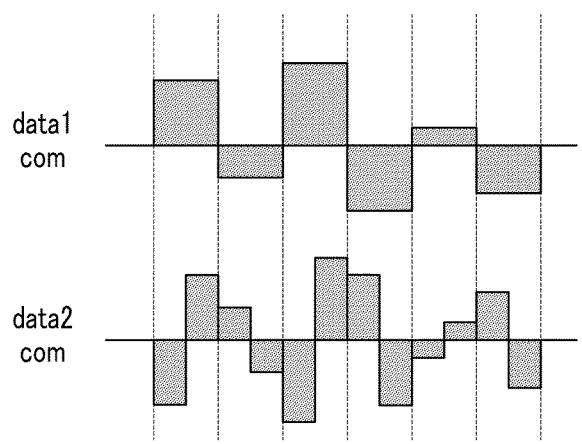
FIG. 12 is a waveform diagram showing an exemplary embodiment of a method of driving an exemplary embodiment of an LCD according to the present invention.

FIGS. 11A, 11B and FIG. 12 are views showing another exemplary embodiment of a method of driving an LCD according to the present invention.

FIGS. 11A and 11B are schematic cross-sectional views of an exemplary embodiment of an LCD, and schematically represent a common electrode of an upper panel and the first and second pixel electrodes of a lower panel, and represents an arrangement of liquid crystal molecules according to an electric field. In FIGS. 11A and 11B, the solid line indicates the electric field, and the dotted line indicates the liquid crystal molecules. The first and second pixel electrodes are alternately arranged, the leftmost pixel electrode is the first pixel electrode, and the second pixel electrode and the first pixel electrode are alternately disposed toward the right side therefrom.

In FIGS. 11A and 11B, the common electrode is applied with a common voltage and the first pixel electrodes are applied with the first data signal. However, the second pixel electrodes are applied with the same data signal as the first data signal in FIG. 11A, and are applied with a different data signal from the first data signal in FIG. 11B.

That is, during the time a gate-on signal is applied through one gate line, the first pixel electrode is applied with one first data signal, however the second pixel electrode is dividedly applied with the same data signal as the first data signal and the different data signal.

FIG. 12 is an exemplary embodiment of a waveform of the above-described driving types with reference to each data line.

In FIG. 12, data1 indicates the first data voltage according to the first data signal applied to the first pixel electrode, and data2 is a signal that is divided into the same voltage as the first data signal and a voltage having the opposite polarity thereto and is applied to the second pixel electrode. As in FIG. 10, a dotted line formed in a vertical direction represents the time that the gate-on voltage is applied to one gate line, and a horizontal line represents the common voltage in FIG. 12. Although data2 is here represented as having a substantially opposite polarity as data 1, this is but one exemplary embodiment, and other signals may be applied as data2.

The first pixel electrode is applied with the first data voltage according to the first data signal data1 during the application of the gate-on voltage. In contrast, the second pixel electrode is applied with a voltage that has the same magnitude as the data voltage and has the opposite polarity (hereinafter referred to as "opposite polarity voltage") during a predetermined interval, and then is applied with the first data voltage having the same magnitude and polarity as the data voltage applied to the first pixel electrode. In the present exemplary embodiment, the predetermined interval may be about half of the time period of application of the first data voltage to the first pixel electrode.

If the LCD is driven in this way, the horizontal electric field is formed between the first pixel electrode and the second pixel electrode during the time that the second pixel electrode is applied with the opposite polarity voltage such that the liquid crystal molecules are pre-tiled, and then if the second pixel electrode is applied with the first data voltage, the horizontal electric field disappears and the vertical electric field is formed such that the liquid crystal molecules are rotated, thereby obtaining the desired transmittance.

When the second pixel electrode is applied with the opposite polarity voltage, the common electrode is applied with the common voltage such that the vertical electric field also exists between the first pixel electrode and the common electrode. However, the distance between the first pixel electrode and the common electrode is larger than the distance between the first pixel electrode and the second pixel electrode such that the horizontal electric field is more strongly applied, thereby forming the pre-tilt without difficulty. On the other hand, compared with the exemplary embodiment of FIGS. 9A, FIG. 9B and FIG. 10, the exemplary embodiment of FIGS. 11A, 11B and FIG. 12 has a stronger horizontal electric field. This is because the difference between the voltages applied to the first and the second pixel electrodes is larger in the exemplary embodiment of FIGS. 11A, FIG. 11B and FIG.

12. As a result, there is a benefit that the liquid crystal molecules are quickly pre-tilted in the exemplary embodiment of FIG. 11 and FIG. 12.

Figure 13A:
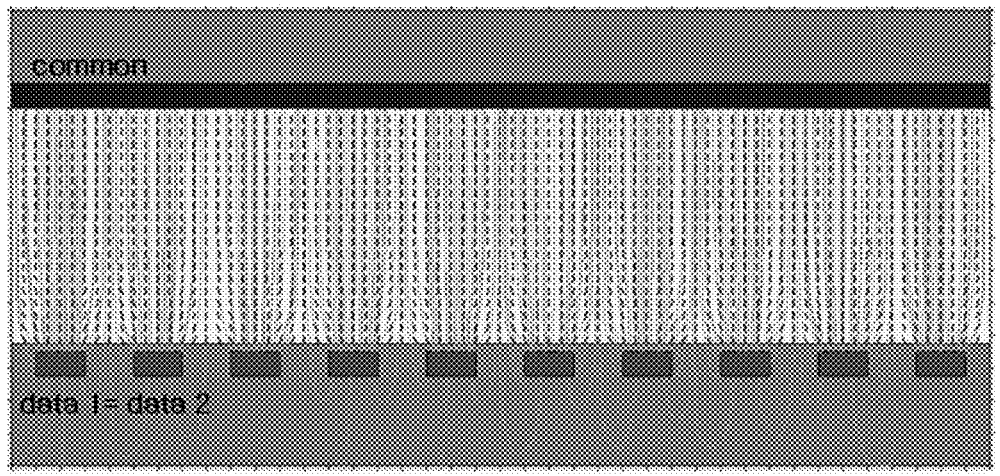
FIGS. 13A and 13B are cross-sectional views illustrating another exemplary embodiment of a method of driving an exemplary embodiment of an LCD according to the present invention.
Figure 13B:
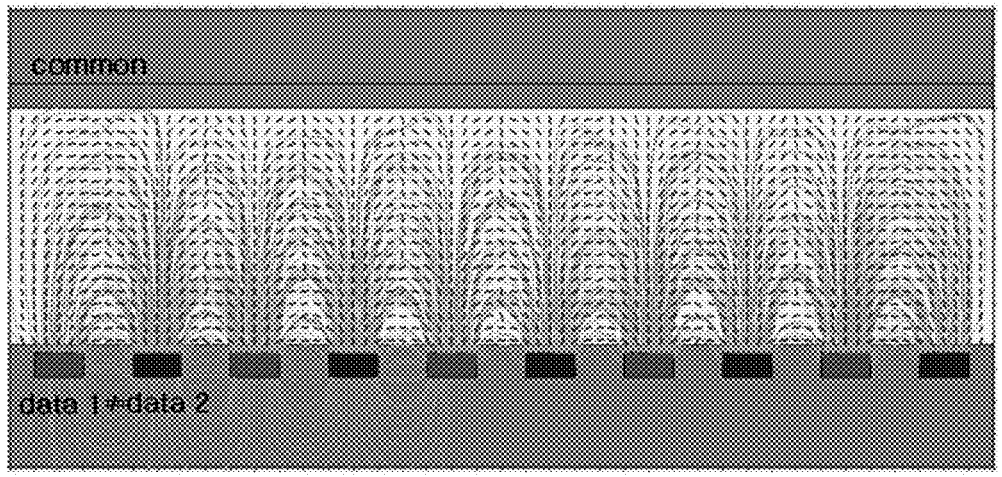

FIGS. 13A and 13B are cross-sectional views showing another exemplary embodiment of a method of driving an exemplary embodiment of an LCD according to the present invention.

FIGS. 13A and 13B are cross-sectional views of an exemplary embodiment of an LCD including a common electrode of an upper panel, the first and second pixel electrodes of the lower panel, and liquid crystal molecules arranged according to an electric field. In FIGS. 13A and 13B, a solid line indicates the electric field, and a dotted line indicates the liquid crystal molecules. The first and second pixel electrodes are alternately arranged, the leftmost pixel electrode is the first pixel electrode, and the second pixel electrode and the first pixel electrode are alternately disposed toward the right side therefrom.

In FIGS. 13A and 13B, the first pixel electrodes are all applied with the first data signal. However, the second pixel electrode is applied with the first data signal in FIG. 13A, and is applied with a different data signal from the first data signal in FIG. 13B. Also, the common electrode is applied with the common voltage in FIG. 13A, however the common electrode is not applied with the common voltage and is instead applied with a floating ground voltage in FIG. 13B.

That is, during the time a gate-on signal is applied through one gate line, the first pixel electrode is applied with one data signal, however the second pixel electrode is dividedly applied with the same data signal as the data signal and the different data signal therefrom, and the common electrode is dividedly applied with the common voltage and a floating ground voltage.

Here, the different data signal from the first data signal among the voltages that are applied to the second pixel electrode may be varied according to the various exemplary embodiments. That is, similar to the exemplary embodiments of FIG. 11A, FIG. 11B and FIG. 12, the voltage having the opposite polarity may be applied, or the different voltages therefrom may be applied.

In the exemplary embodiment of FIG. 13, the cases in which the common electrode is applied with the common voltage and is not applied with the common voltage are added. That is, the first pixel electrode is applied with the first data voltage according to the first data signal during the application of the gate-on voltage. In contrast, the second pixel electrode is applied with the different voltage from the first data voltage (the voltage may be the opposite polarity voltage or the different voltage, however an example is the opposite polarity voltage) during a predetermined interval, and then is applied with the first data voltage. Next, the common electrode enters a floating state during the period in which the second pixel electrode is applied with the different voltage from the first data voltage, and the common electrode is applied with the common voltage during the period in which the second pixel electrode is applied with the first data voltage. In one exemplary embodiment, the common voltage does not equal 0 V such that there is a voltage difference existing between the case in which the common voltage is not applied and is floated, and the case in which the common voltage is applied.

If the LCD is driven in above-described way, the horizontal electric field is formed between the first pixel electrode and the second pixel electrode during the period in which the second pixel electrode is applied with the voltage which is different than the first data voltage such that the liquid crystal molecules are pre-tilted, and then if the data voltage is applied to the second pixel electrode, the horizontal electric field disappears and the vertical electric field is applied such that the liquid crystal molecules are rotated, thereby displaying the desired transmittance.

When the second pixel electrode is applied with the voltage which is different than the first data voltage, the common electrode enters a floating state such that the horizontal electric field is only formed between the first and second pixel electrodes, and accordingly there are merits that the pre-tilt is more easily formed and that the time during which the pre-tilt is formed may be reduced.

The various exemplary embodiments of the driving type for the LCD according to an exemplary embodiment of the present invention were explained through FIG. 9 to FIG. 13.

Next, LCDs having different structures from the LCD of FIG. 1 will be described with reference to FIGS. 14 and 15.

Figure 14:
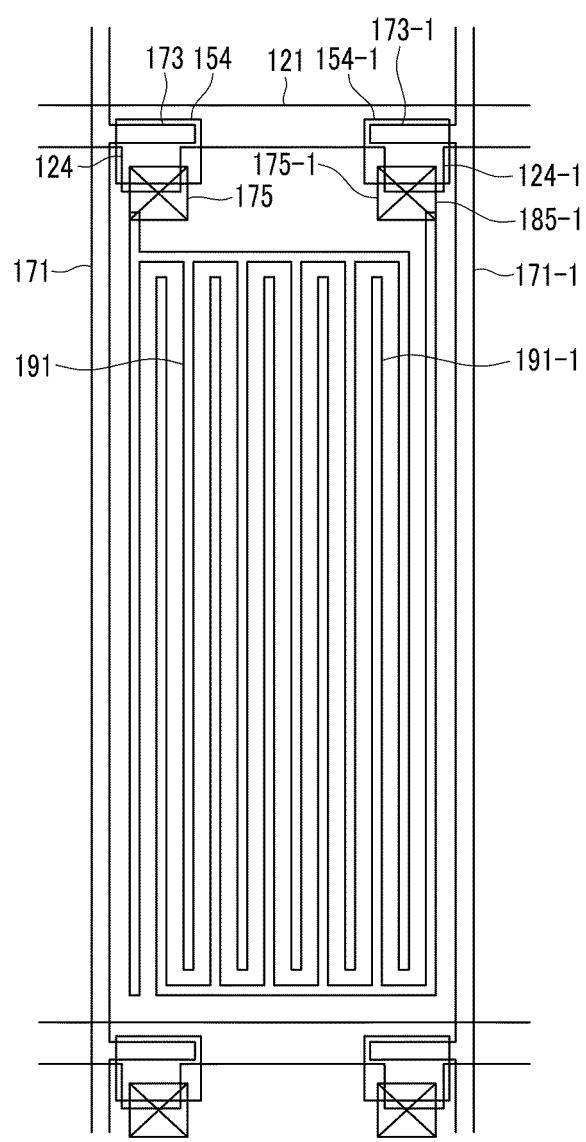
FIG. 14 is a top plan layout view of one exemplary embodiment of a pixel in an exemplary embodiment of an LCD according to the present invention.

FIG. 14 is a top plan layout view of one pixel in another exemplary embodiment of an LCD according to the present invention.

An exemplary embodiment of FIG. 14 has substantially the same structure as the exemplary embodiment of FIG. 1, except for the structure of the first and second pixel electrodes 191 and 191-1.

In the exemplary embodiment of FIG. 14, the first pixel electrode 191 includes a first stem substantially parallel to the gate line 121 and a plurality of first branches extending substantially perpendicularly therefrom. On the other hand, the second pixel electrode 191-1 includes a second stem substantially parallel to the gate line 121 and a plurality of second branches extending substantially perpendicularly therefrom. The first stem and the second stem are disposed substantially apposite to each other with a predetermined distance therebetween, and are alternately arranged. On the other hand, the first pixel electrode 191 further includes a first connection extended in the opposite direction to the first stem from the first stem for connection with the first drain electrode 175. Also, the second pixel electrode 191-1 further includes the second connection extended from the end portion of the second branches for connection with the second drain electrode 175-1. The first and second connections may be formed in the first and second pixel electrodes 191 and 191-1 according to the structure of the pixel. Alternative methods of connecting the first and second pixel electrodes 191 and 191-1 to the TFTs may also be used as would be apparent to one of ordinary skill in the art.

Compared with FIG. 1, the direction of the horizontal electric field in FIG. 14 is different from the exemplary embodiment of FIG. 1. That is, the rotating direction of the m-axis of the liquid crystal molecules 310 is different when pre-tilting. In FIG. 1, the horizontal electric field is formed in the direction substantially parallel to the data line, and the m-axis of the liquid crystal molecules 310 are arranged in the direction substantially parallel to the data lines under the pre-tilt, however in the present exemplary embodiment shown in FIG. 14, the m-axis of the liquid crystal molecules 310 are arranged in the direction substantially parallel to the gate line.

Figure 15:
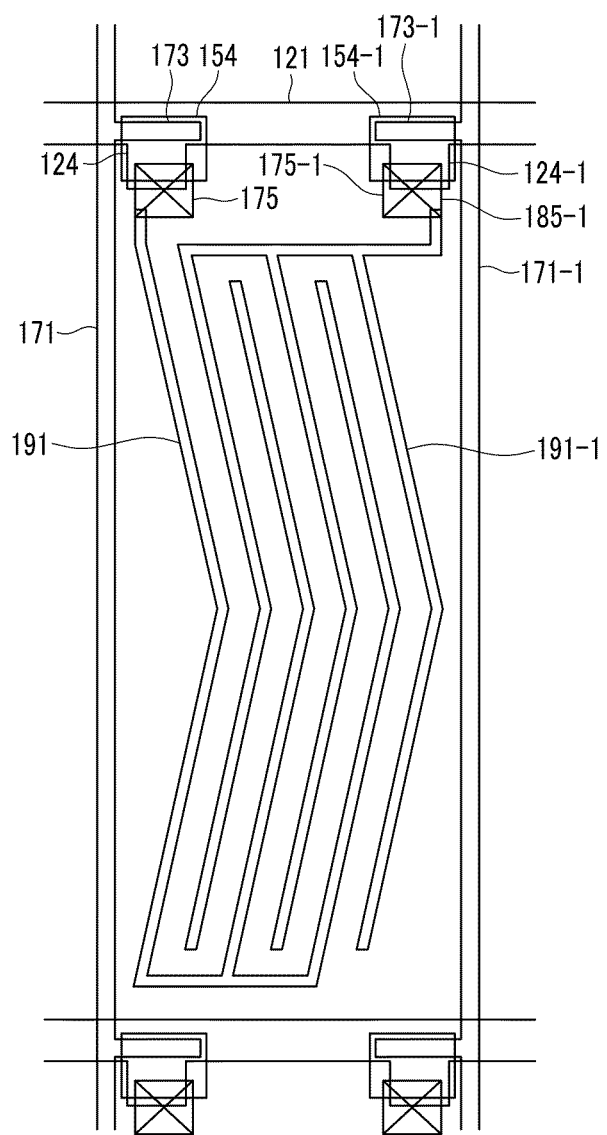
FIG. 15 is a top plan layout view of one exemplary embodiment of a pixel in an exemplary embodiment of an LCD according to the present invention.

A pixel electrode having another structure is shown in FIG. 15.

FIG. 15 is a top plan layout view of one pixel in an exemplary embodiment of an LCD according to the present invention.

The exemplary embodiment of FIG. 15 also has substantially the same structure as the exemplary embodiment of FIG. 1, except for the structure of the first and second pixel electrodes 191 and 191-1.

In the exemplary embodiment of FIG. 15, the first pixel electrode 191 includes a first stem disposed substantially parallel to the gate line 121 and a plurality of first branches connected thereto, one end of each of the first branches is connected to the first stem, and the other end thereof is disposed upward in the direction of the data lines 171 and 171-1, and the portions of the first branches disposed therebetween are curved with a predetermined angle. On the other hand, the second pixel electrode 191-1 includes a second stem disposed substantially parallel to the gate line 121, and a plurality of second branches connected thereto. One end of each of the second branches is connected to the second stem, the other end thereof is disposed downward in the direction of the data lines 171 and 171-1, and portions of the second branches disposed therebetween are curved with the predetermined angle. The first stem and the second stem are disposed substantially opposite each other with a predetermined distance therebetween, and the first branches and the second branches are disposed substantially parallel to each other with a predetermined distance therebetween and are alternately disposed. In one exemplary embodiment, the first and second pixel electrodes 191 and 191-1 may further include a connection parallel to the data line for connection with the first and second drain electrodes 175 and 175-1.

In the exemplary embodiment of FIG. 15, the horizontal electric field between the first and second pixel electrodes 191 and 191-1 is not parallel to the gate line and the data line. Accordingly, the arrangement of the liquid crystal may be different from FIG. 5 to FIG. 7, however the polarizer, the rubbing direction, the initial alignment direction, and the curved angle of the branches of the pixel electrodes 191 and 191-1 may be controlled to display images without problems. Also, the liquid crystal is arranged in the various directions in one pixel such that the characteristics may be improved in the aspect of the viewing angle.

As above-described, the present invention uses the biaxial liquid crystal, and displays images by using a horizontal electric field and a vertical electric field. While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
    a first substrate;
    a gate line disposed on the first substrate;
    a first data line and a second data line both of which are disposed on the first substrate, and insulated from and disposed substantially perpendicular to the gate line;
    a first thin film transistor connected to the gate line and the first data line;
    a second thin film transistor connected to the gate line and the second data line;
    a first pixel electrode connected to the first thin film transistor;
    a second pixel electrode connected to the second thin film transistor;
    a second substrate disposed substantially opposite to the first substrate;
    a common electrode disposed on the second substrate; and
    a liquid crystal layer disposed between the first substrate and the second substrate, and including biaxial liquid crystal,
    wherein the liquid crystal display has an initial alignment stage, a pre-tilt stage, and an alignment stage, and
    wherein the biaxial liquid crystal is pre-tilted according to a horizontal electric field in the pre-tilt stage.

2. The liquid crystal display of claim 1, wherein
    the first pixel electrode and the second pixel electrode respectively include a first stem and a second stem, and a plurality of first branches and second branches respectively connected to the first stem and the second stem.

3. The liquid crystal display of claim 2, wherein the first branches and the second branches are alternately disposed with respect to each other.

4. The liquid crystal display of claim 3, wherein the first stem and second stem are disposed substantially parallel to the gate line, or the first data line and the second data line, and
    the first branches and the second branches are disposed substantially perpendicular to the first stem and the second stem.

5. The liquid crystal display of claim 4, wherein the first pixel electrode and the second pixel electrode respectively further include a first connection and a second connection for connection with the first thin film transistor and the second thin film transistor, respectively.

6. The liquid crystal display of claim 3, wherein the branches are curved at a predetermined angle.

7. The liquid crystal display of claim 1, wherein the first pixel electrode and the second pixel electrode are configured to include a period in which substantially the same voltage is applied thereto and a period in which a different voltage is applied thereto during one frame.

8. The liquid crystal display of claim 1, wherein the biaxial liquid crystal has different refractive indexes and different dielectric ratios in x-, y-, and z-axis directions, and an axis direction having a maximum refractive index and an axial direction having a maximum dielectric ratio are different from each other.

9. The liquid crystal display of claim 1, wherein the biaxial liquid crystal has different refractive indexes and different dielectric ratios in x-, y-, and z-axis directions, and an axis direction having a maximum refractive index and an axial direction having a maximum dielectric ratio are substantially the same.

10. The liquid crystal display of claim 1, wherein the rubbing direction for the biaxial liquid crystal is oblique to the gate line and the first data line and the second data line.

11. The liquid crystal display of claim 10, further comprising:
    polarizers attached to the outside surface of the first substrate and the second substrate,
    wherein the transmittance directions of the polarizers are oblique to the gate line and the first data line and second data line.

* * * * *